INVENTOR.
William G. Livezey
BY
W. C. Middleton
ATTORNEY.

INVENTOR.
William G. Livezey
BY
W. C. Middleton.
ATTORNEY.

United States Patent Office 2,981,103
Patented Apr. 25, 1961

2,981,103

TORQUE APPLYING DEVICE

William G. Livezey, Indianapolis, Ind., assignor to General Motors Corporation, Detroit, Mich., a corporation of Delaware Filed Feb. 28, 1957, Ser. No. 643,085

31 Claims. (Cl. 73—162)

This invention relates to apparatus for testing power transmission mechanisms and particularly to torque applying devices for testing the mechanisms under load.

In the testing of power transmission mechanisms, it is always preferable to conduct the test under conditions as closely approximating the actual or intended use as possible. To create artificial loads, in some instances, the output of the mechanism is restrained in amounts corresponding to the intended operating load by some sort of power or energy absorbing dynamometer devices, such as an electrical generator or a prony brake. These systems, although inefficient due to the waste of energy necessary to create a load, may be used when both the loads and the mechanism are small. However, when the test load becomes excessive or the mechanism is large and bulky, the dynamometer devices must accordingly be enlarged. It is obvious that such devices may become impractical, especially when considering the inefficiency and size of equipment required.

In view of these objections, it is now common to apply a static torque load to the mechanism to be tested and then to operate the mechanism at the desired speed with this load maintained. In this type application, the power transmission mechanism to be tested is inserted into a drive apparatus which usually comprises intergeared line shafts connected to the input and output of the mechanism, a torque applying device, and a driving motor connected to both the apparatus input and output. Then, the torque applying device is operated to induce a torsion or twist into the apparatus which torsion is maintained at some desired value as shown by a torque meter or gauge. The driving motor rotates the apparatus at the appropriate test speed with the only load requirements of the motor being the necessity to overcome frictional forces in sustaining this speed. In general, to be satisfactory the torque applying device for this application should be easily manipulated to vary torque loads accurately, and capable of applying and maintaining torque loads in either a forward or reverse direction.

With these considerations in mind, the invention contemplates for inducing static torque loads into a test apparatus a new and improved torque applying device or torque applier that is capable of applying and releasing torque in either a forward or reverse direction while the apparatus is in operation; that is capable of taking up any amount of slack or wind-up in a system; that does not require an additional source of power for torque application, other than the inherent rotation of the system necessary for operating the test apparatus at some predetermined speed; that automatically locks and holds any torque setting; and that is capable of being indexed for installation and timing purposes.

In gear type torque applying devices, regard must be given to the number of intermeshing gears utilized for applying torque. With multiple gearing, each rolling contact between gear teeth presents undesired frictional losses reducing a gear train's efficiency as do journal losses from rotatably mounted gears. Furthermore, to satisfactorily induce torsion into a system with gearing, it is necessary that when the torque load is being applied as between input and output members that the speed ratio between these members be small both for accuracy and to insure against breakage from too quickly overloading the members. To achieve such a small ratio, the gear type torque applier must have a very large overall speed ratio therethrough which means that some of the gears will be rotating at high speeds and, of course, adequate support for these high speed gears is a problem.

The present invention proposes a gear type torque applier which utilizes planetary gearing having a substantially large overall ratio. This large ratio provides a relatively small speed ratio between the input and output of the torque applier allowing minute increment adjustments of the torque load. After a load is applied, the planetary gearing may be conveniently locked up to maintain the load and hence, the planetary gearing rotates as a unit without any relative motion between the various gears. Consequently, there is no rolling contact between the gear teeth of the planetary gearing, nor is there any journal losses so that torque loads can be maintained without any additional frictional losses affecting the efficiency of operation. Furthermore, in the invention, high speed planet pinions are arranged so that rolling contact between the gear teeth provides a support as well as the support provided by a novel interrelation of planet pinion carriers.

The foregoing and other objects and advantages will be apparent in the following description and from the accompanying drawings in which.

Figure 1:
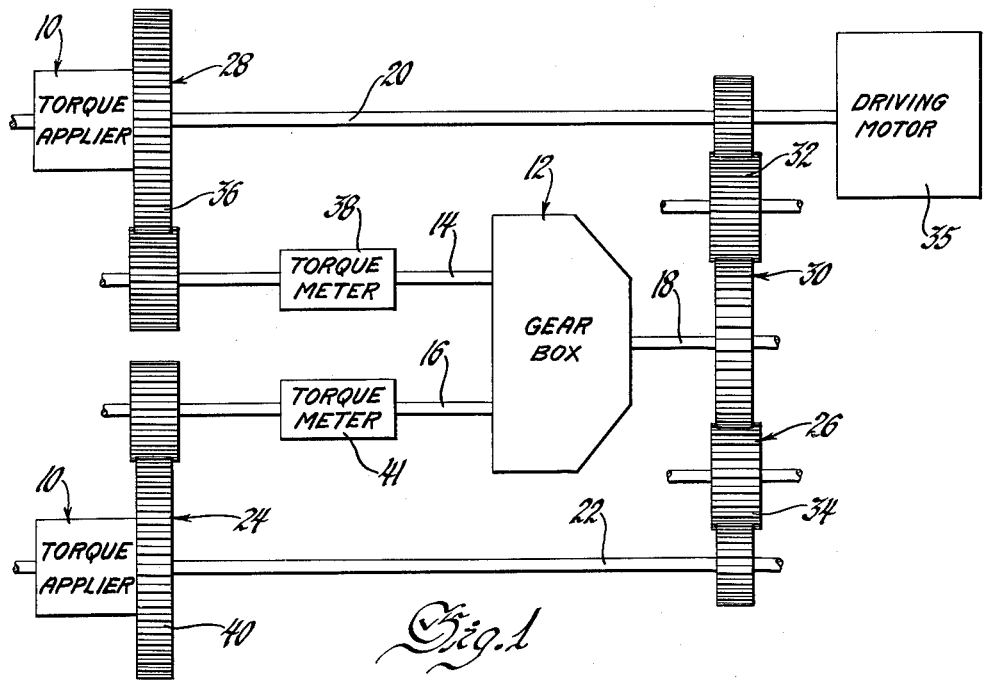
Figures 1 and 2 illustrates schematically different embodiments of apparatus employing torque applying devices according to the invention.
Figure 2:
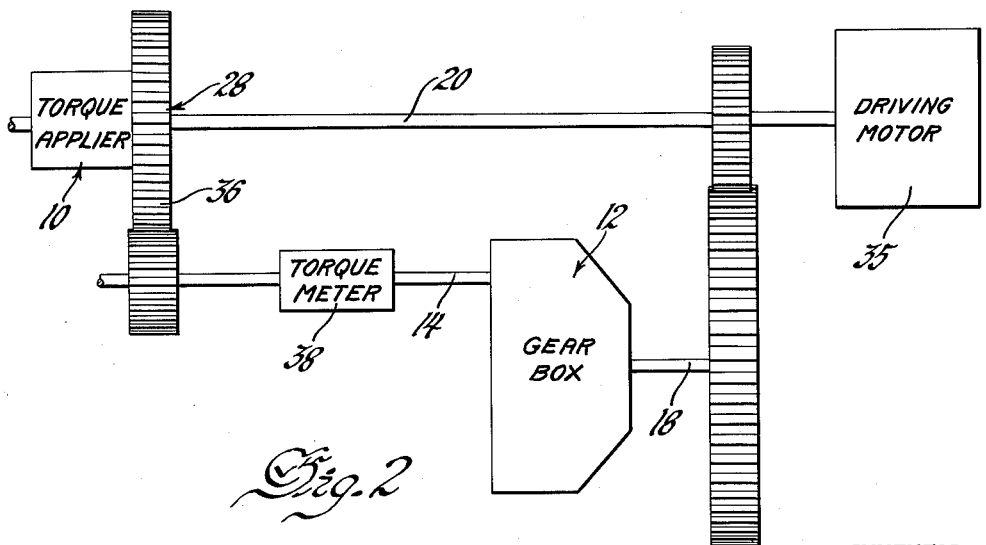

Figures 1 and 2 demonstrate apparatus employing torque applying devices or torque appliers 10 according to the invention for testing gear boxes 12. Both the Figures 1 and 2 apparatus provide a closed type drive system in which the input and output for the apparatus are interconnected. As a result, when one of two adjacent members is rotated relative to the other (the function of a torque applier), a wind-up or twist is induced into the system. Basically, this procedure is analogous to holding one end of a shaft while twisting the opposite end, the twist being regarded as a static torque load.

In Figure 1, the gear box 12 has plural outputs 14 and 16 and an input 18, all of which are substantially parallel to the intergeared line shafts 20 and 22. Line shaft 22 is intergeared with the output 16 through end gearing 24 and with input 18 through end gearing 26 while line shaft 20 is intergeared with the output 14 through end gearing 28 and with input 18 through end gearing 30. The gear ratios of the end gearing are determined by that through the gear box 12 in order that the input 18 and the outputs 14 and 16 for the gear box 12 and the line shafts 20 and 22 will be going at the correct speed for a closed system. In explaining the necessity for correct speeds, it is obvious that each end of the line shaft 20 and 22 must be going at the same speed as mentioned in the shaft analogy above. Otherwise, a wind-up occurs that will eventually break the shafts, With the Figure 1 plural output installation, idler gears 32 and 34 are furnished for end gearing 30 and 26, respectively, since the outputs 14 and 16 rotate oppositely to the direction of rotation of the input 18 for the gear box 12. When as in Figure 2 the single output 14 rotates in the same direction as input 18, an idler gear is not necessary.

Each of the apparatuses of Figure 1 and Figure 2 may be driven externally by a suitable source, for instance, a driving motor 35 detachably secured to the end gearing 30. With the apparatus rotating, the torque appliers 10 can be operated to impose torsion into the system, e.g., by rotating an output member or gear 36 relative to line shaft 20 until the desired torque load is indicated by a torque gauge or meter 38 installed on the output 14 or by rotating an output member or gear 40 relative to the line shaft 22 until the desired torque load is shown by a torque gauge or meter 41 installed on the other output 16 of the gear box 12. By rotating one of the torque applier output gears relative to the associated torque applier input shaft a twist results that takes up slack or wind-up in the apparatus and creates a static torque load. The load, of course, is determined by that which the test gear box 12 is to be subjected to during actual use. The function of the driving motor 35 is only to rotate the apparatus and the gear box 12 at the speed dictated by these conditions of actual use. Because the torque load is static, friction is the only resistance to rotation.

Figure 3:
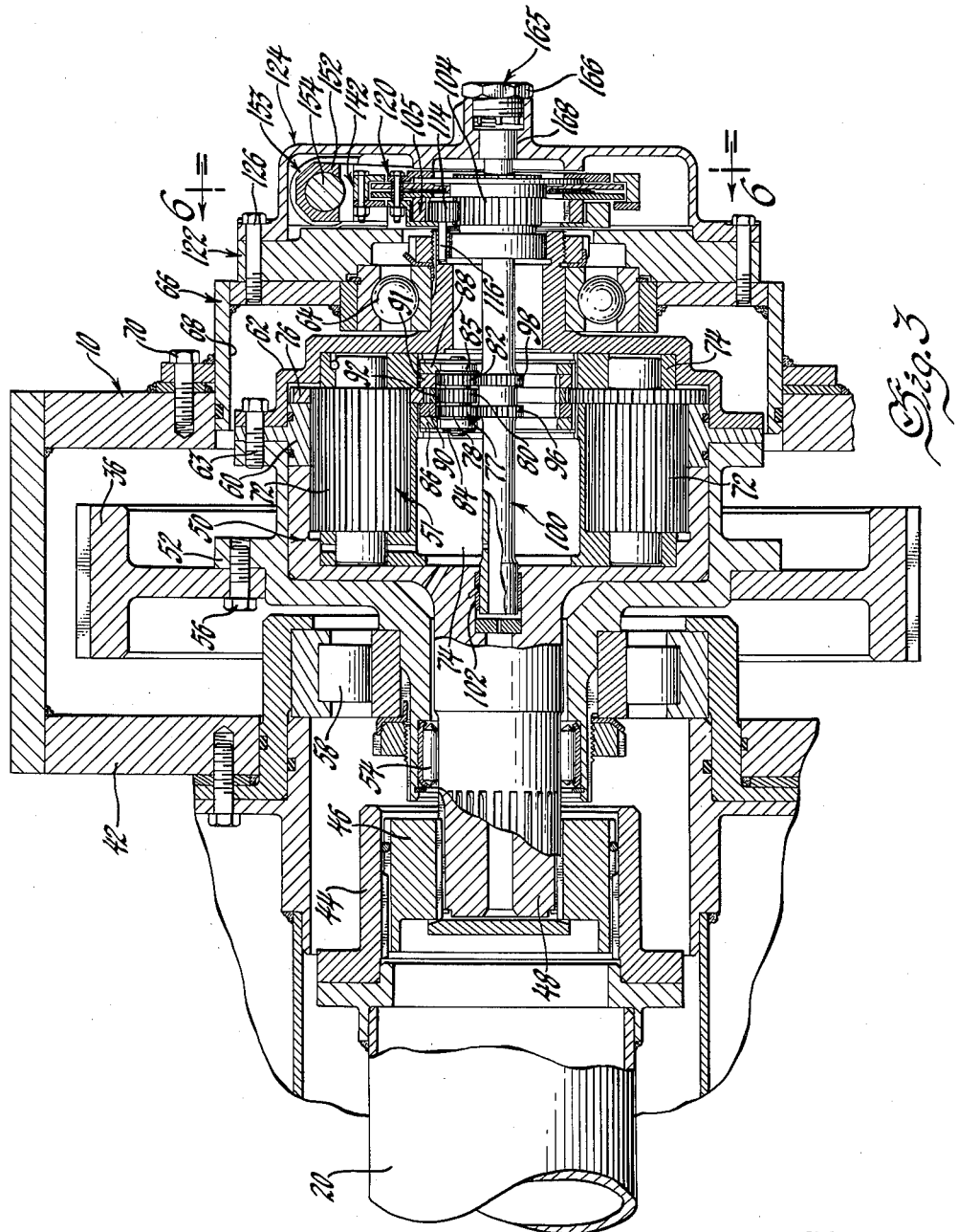
Figure 3 is a cross-sectional view of the torque applying device.
Figure 4:
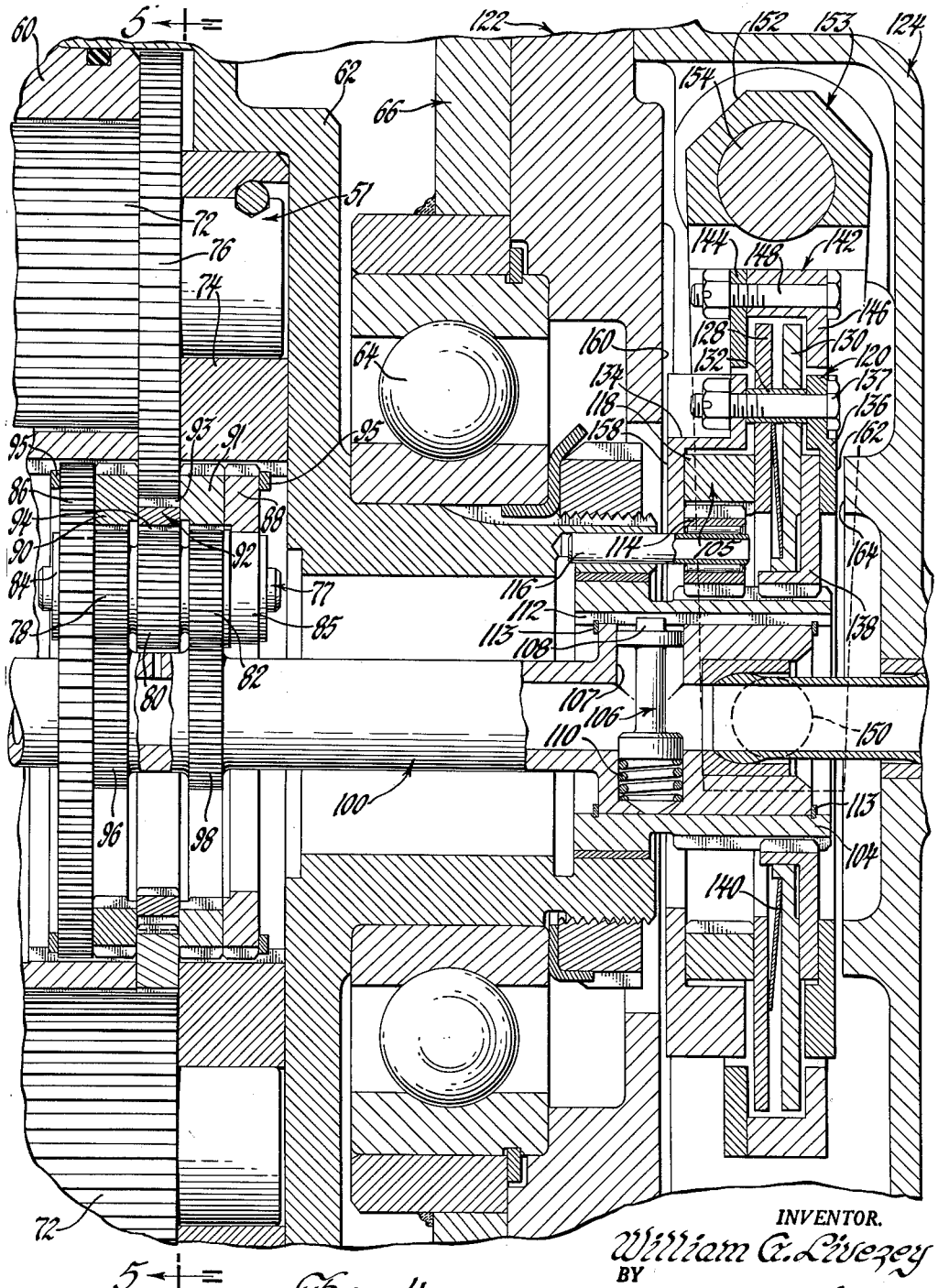
Figure 4 is an enlarged fragmentary cross-sectional view of the torque applying device.
Figure 5:
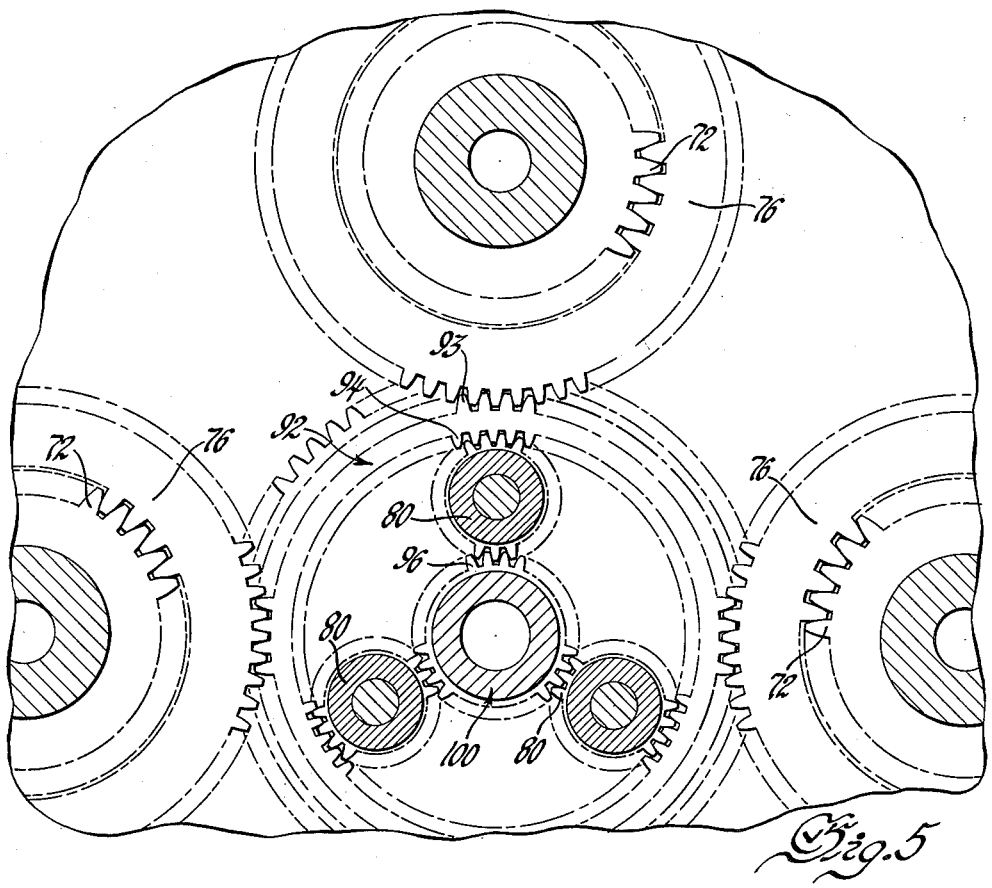
Figure 5 is a view of the torque applying device gearing taken along line 5—5 of Figure 4.

Referring to Figures 3 and 4, the details of a preferred embodiment of the torque appliers 10, installed coaxially with and between a driving or input member, e.g., line shaft 20 and a driven or output member, e.g., output gear 36, are depicted. Selection of which members are to be driving and driven has been made for convenience in describing the torque applier. It is obvious that the driving—driven relationship can be reversed. Extending into a side of a suitably supported gear housing 42 for the torque applier is the line shaft 20 with an attached connecting flange 44 drive connected through an intermediate element 46 to a shaft end 48 of an input ring gear 50 for a first planetary gear set 51. The input ring gear 50 is journalled within a support housing 52 at the shaft end 48 by needle bearings 54 and at the gear end by an internal bearing fit along the periphery of the gear. Support housing 52 is detachably annexed to the output gear 36 by a series of bolts 56 and is rotatably mounted in the housing 42 by an anti-friction bearing 58. An output ring gear 60 for the first planetary gear set is interposed between the support housing 52 and a bearing mount 62 all of which are held together by bolts 63. The mount 62 is journalled by an anti-friction bearing 64 to an intermediate housing 66 which housing is positioned by guide end 68 to the housing 42 and attached thereto by bolts 70. Hence, drive is from line shaft 20 to input ring gear 50, through the torque applier planetary gearing, to output ring gear 60 and thence to output gear 36.

The first planetary gear set 51, which is coaxial with line shaft 20 and output gear 36, comprises a first set of elongated planet pinions 72 journalled to a planet carrier 74 and meshing with both the input and output ring gears 50 and 60 and a second set of narrower planet pinions 76. Planet pinions 76 have internal gear teeth interengaging with the external gear teeth of the first set planet pinions 72 and are positioned axially on the planet pinions 72 between the output ring gear 60 and the bearing mount 62. Carrier 74 is rotatably supported on one side by the ring gear 50 and on the other side by bearing mount 62.

Intergeared with the first planetary gear set 51 and concentric therewith is a second or intermediate planetary gear set 77 which includes a plurality of integral planet pinions 78, 80 and 82 journalled at the opposite ends by side rollers 84 and 85. Side rollers 84 and 85 are radially supported and endwise positioned by annular support rings 86 and 88 which rings are oppositely spaced and adjacent the pinions 78 and 82, respectively, and which are splined to the carrier 74. On opposite sides of the first planetary gear set pinions 76 and inside the space defined by the annular support rings 86 and 88 are a pair of ring gears 90 and 91 in engagement with the second planetary gear set pinions 78 and 82, respectively, and splined to the first planetary gear set carrier 74. A gear member 92, that includes a sun gear portion 93 in engagement with planet pinions 76 and a ring gear portion 94 in engagement with the middle planet pinions 80, functions as both a sun gear for the first planetary gear set 51 and a ring gear for the second planetary gear set 77. The annular support rings 86 and 88, ring gears 90 and 91 and the gear member 92 are all axially located by snap rings 95.

With the foregoing in mind, it will be noted that the integral planet pinions 78, 80 and 82 do not have a planet carrier as such, but are held in angular relationship by the intermeshing gear teeth and supported against centrifugal loads by the support rings 86 and 88, together performing a carrier function. Also, the inside diameter of the support rings 86 and 88 is the same as the operating pitch diameter of the ring gears 90 and 91. Consequently, the high speed planet pinions 78, 80 and 82 are appropriately supported without the necessity of a separate carrier and multiple bearings. The side rollers 84 and 85 have anti-friction type rolling contact with the support rings 86 and 88 in the same manner as a conventional anti-friction ball or roller bearing, a significant feature.

The intermediate planetary gear set 77 has a sun gear 96 in engagement with pinions 78 and a sun gear 98 in engagement with pinions 82. Sun gears 96 and 98 are formed integrally with a hollow control or intermediate shaft 100 which is, also, the rotational axis for the first and second gear sets. The intermediate shaft 100 is coaxially journalled at the left end within a bore 102 in the ring gear 50 and at the opposite end is drive connected with and supported by a sun gear 104 for a third or control planetary gear set 105. The sun gear 104 is, in turn, rotatably supported by the bearing mount 62. The drive connection between the sun gear 104 and the intermediate shaft 100 is accomplished through a disconnect pin 106 slidably positioned within a transverse bore 107 in the right end of the intermediate shaft 100. The disconnect pin 106 includes a drive end 108 biased by a compression spring 110 into a key slot 112 in the sun gear 104. Snap rings 113 between the right end of the intermediate shaft and the sun gear 104 prevent relative endwise movement therebetween.

The control planetary gear set 105, which is coaxial with shaft 100, has a series of planet pinions 114 rotatably mounted on pins 116 secured to bearing mount 62. There is a loose diametrical fit between the pinions 114 and the pins 116 since the pins only push the pinions around their orbit. The radial load due to centrifugal force on the pinions 114 is carried by the tight mesh between the high pressure angle teeth of the pinions and a reaction ring gear 118. The connection of the pins 116 to the bearing mount 62 was made only for convenience inasmuch as the operation of the torque applier would be virtually the same if the pins 116 were connected to either the first planetary gear set carrier 74 or input ring gear 50.

For rendering the planetary gear set 105 operative to alter the overall ratio through the torque applier 10, a clutch assembly 120 is employed and is housed by an abutment plate 122 adjacent the intermediate housing 66 and a side cover 124, both of which are attached to the intermediate housing 66 by bolts 126. The assembly 120 includes clutch plates 128 and 130 supported by a plurality of tubular spacers 132 interposed between and for spacing apart side members 134 and 136. A series of nut and bolt assemblies 137 clampingly maintain the assembly 120 together. The side members 134 and 136 define an inner space into which on opposite sides are loosely disposed endwise, the reaction ring gear 118 and a sun gear connected element 138. Between ring gear 118 and element 138 are the clutch plates 128 and 130 with a Belleville type spring 140 interposed therebetween. Spring 140 constantly urges apart the clutch plates 128 and 130 so that, normally, the ring gear 118 and element 138 are in frictional engagement with side members 134 and 136. Hence, the control gear set 105 is locked up and all of the torque applier gearing rotates as a unit.

Coacting with the clutch assembly 120 is a brake assembly 142 including a forward brake plate 144 spaced from a reverse brake plate 146, both of which are retained together by a series of nut and bolt units 148 in overlapping relation with the outer ends of the clutch plates 128 and 130. The assembly 142 is pivotally suspended through diametrically disposed pins 150 by a trunnion or yoke 152 for a manually operated device 153.

Figure 6:
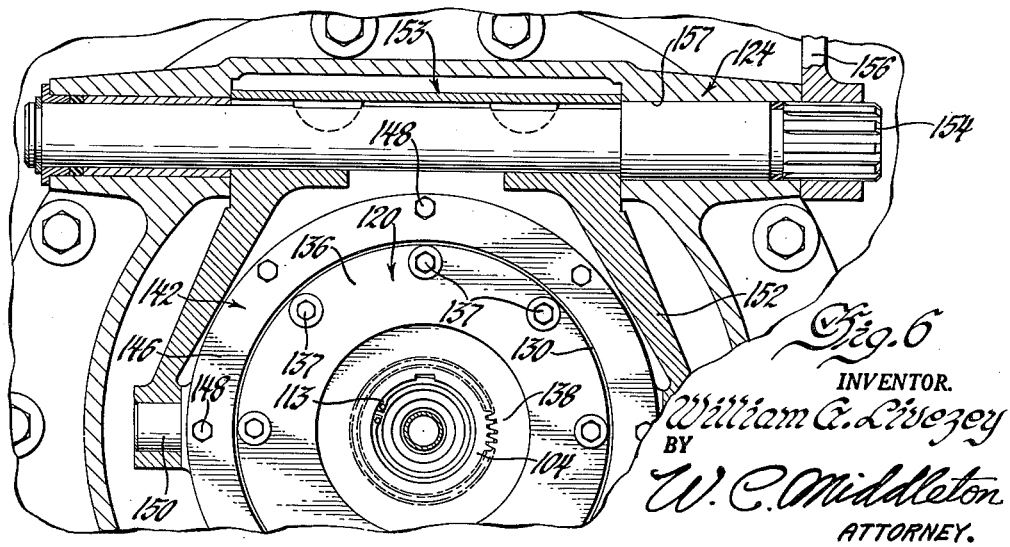
Figure 6 is a view of an operating means for the torque applying device and taken along the line 6—6 of Figure 3.

As best shown by Figure 6, the manually operated device 153, which pivots the brake assembly 142, comprises, in addition to the yoke 152, an operating shaft 154 connected to the yoke and an operating handle 156 affixed to one end of the shaft. Since the shaft 154 is rotatably supported within a bore 157 in the side cover 124, clockwise rotation (as viewed in Figure 4) of the handle 156 and accordingly the yoke 152, will move the brake assembly 142 so that reverse plate 146 engages the clutch plate 130. As a result, the clutch assembly 120 will be moved to the left until face 158 of the side member 134 frictionally engages face 160 of the abutment plate 122 preventing rotation of the clutch assembly. The Belleville spring 140 is compressed allowing the sun gear connected element 138 to rotate freely while the reaction ring gear 118 is held tightly against the adjacent face of the clutch assembly side member 134. With ring gear 118 stopped, a torque load in a reverse direction is imposed between the input and output ring gears 50 and 60 of the first planetary gear set 51. When the handle 156 is rotated in the opposite direction, i.e., counter-clockwise, brake plate 144 of brake assembly 142 engages clutch plate 128 and moves the clutch assembly 120 to the right so that face 162 of side member 136 engages a face 164 on the side cover 124. Again the Belleville spring 140 is compressed releasing ring gear 118 for free rotation while the sun gear connected element 138 is held against the stationary clutch assembly side member 136, hence resisting rotation of the sun gear 104. This imposes a torque load in a forward direction between the input and output ring gears 50 and 60. Release of the handle 156 permits the Belleville spring 140 to move the clutch plates 128 and 130 apart and into engagement with both the ring gear 118 and the sun gear connected element 138 moving this gear 118 and element 138 against the side members 134 and 136. Thus, the ring gear 118 and the sun gear 104 will be clutched together; hence, the control planetary gear set 105 will rotate as a unit, locking up the torque applier 10 and maintaining any torque load that has been imposed by the torque applier.

To permit installation and removal of the torque applier from the Figures 1 and 2 apparatus, indexing means 165 is furnished that permits manual rotation of the ring gear 50 and 60. For this reason, the internal splines on the connecting flange 44 for line shaft 20 and the external splines on the intermediate element 46 on the shaft end 48 of the ring gear 50 can be aligned for easy installation. Similarly, rotation of the output ring gear 60 and, thus, the output gear 36 permits easy intermeshing of the teeth of the output gear 36 with an associated gear. To rotate the ring gears 50 and 60, a plug 166 threadedly attached to the side cover 124 and coaxial with the intermediate shaft 100 is removed to uncover an opening 168 in the cover. Then a suitable tool (not shown) can be inserted through the opening into the middle of the hollow intermediate shaft 100 until the tool engages the disconnect pin 106. The tool can be maneuvered to withdraw pin 106 compressing spring 110 and remove the drive end 108 of the pin 106 from the slot 112 in the sun gear 104. With the drive end 108 so removed, the intermediate shaft 100 can be easily turned to reposition the intermediate element 46 and the output gear 36 for installation into a test apparatus.

In explaining the operation of the torque applier, it is assumed that the input line shaft 20 and the output gear 36 are being rotated forwardly by the driving motor 35 for the Figures 1 and 2 apparatus.

As mentioned the operating handle 156, when released, permits the Belleville spring 140 of the clutch assembly 120 to engage the clutch plates 128 and 130 and automatically locks up the control planetary gear set 105 by preventing relative rotation between ring gear 118 and sun gear 104. Thus, all three of the planetary gear sets 51, 77 and 105 rotate as a unit with whatever torque load that has been imposed. Since there is no relative motion of the gears, there is no frictional loss due to rubbing movements between the contacting gear teeth that would reduce the efficiency.

When it is desired to impose a torque load in a forward direction on a test gear box as gear box 12 in Figures 1 and 2, the operating handle 156 is rotated counterclockwise, as viewed in Figure 4. Then, as previously described, the sun gear 104 is maintained stationary. Accordingly, the sun gears 96 and 98 of the intermediate planetary gear set 77 are held while gear sets 51 and 77 continue to rotate forward. In a rotation sense, this is the same as rotating the sun gears 96 and 98 backward with respect to the remainder of the gear train. This causes planetary gear set 77 to rotate backward relative to the carrier 74 for the first planetary gear set 51. Hence, gear member 92 rotates forward relative to the carrier 74 causing carrier 74 to rotate forward relative to the ring gears 50 and 60. Output ring gear 60 now tends to turn forward relative to the input ring gear 50 inducing a torque load therebetween in a forward direction. By releasing the operating handle 156, the Belleville spring 140 will re-engage the clutch plates 128 and 130 and again lock up the gearing with this torque load.

If torque in a reverse direction is desired, then the operating handle 156 is rotated clockwise to restrain the ring gear 118 for the control set 105 from rotation. Sun gear 104 and, of course, the sun gears 96 and 98 of intermediate gear set 77 are overdriven with the sun gears 96 and 98 rotating forward with respect to the remainder of the gear train. As a consequence, the output ring gear 60 tends to move backward with respect to the input ring gear 50 imposing a torque load in the reverse direction. Again, by releasing the handle 156, the clutch maintains this torque load.

*Table 1*

| Gear No.: | No. teeth |
|---|---|
| 50 | 96 |
| 60 | 100 |
| 90 & 92 | 60 |
| 94 | 63 |
| 72 | 24 |
| 76 | 72 |
| 78 & 82 | 19 |
| 80 | 20 |
| 93 | 76 |
| 96 & 98 | 21 |
| 118 | 71 |
| 114 | 20 |
| 104 | 31 |

In both instances, when torque is applied in either a forward or reverse direction, there is an inducement or urging of relative movement between the input and output ring gears 50 and 60. There is not rotation therebetween as such, but only in a very small amount of relative movement depending on the windup to be removed and the torsion to be added. To facilitate understanding of this relative movement and the operating ratios through the torque applier 10, each gear has been assigned the number of gear teeth shown in Table 1. With the sun gear 104 presumed stationary, the overall gear ratio is then 145,775, i.e., the input ring gear 50 turns 145,775 revolutions while the output ring gear 60 turns 145,776 revolutions. This gives an input ring gear/output ring gear ratio of .999993140. Assuming the same number of gear teeth and with the ring gear 118 held, the input ring gear will turn 4,519,127 revolutions while the output ring gear 60 turns 4,519,056 revolutions, an input ring gear/output ring gear ratio of 1.000015711. From these figures, it can be seen that the torque applier ratio is very large, and consequently, the overall ratio between the input and output ring gears is very small. This is a desirable feature, since the torque load can be induced very slowly and accurately. Furthermore, the torque applied can take up any amount of slack or windup in the apparatus without requiring any additional indexing.

I claim:

1. A torque applying device comprising, in combination, input and output members, a plurality of interconnected planetary gear sets interposed between the input and output members, one of the gear sets having reaction elements, brake means selectively operable for holding the reaction elements and varying temporarily the drive ratio between the input and output members so as to impose a torque load therebetween in a forward direction when one reaction element is held and in a reverse direction when the other reaction element is held, and clutch means coacting with one of said plurality of planetary gear sets for maintaining the torque load imposed by the brake means.

2. A torque applying device comprising, in combination, driving and driven members; a first planetary gear set including an input gear connected to the driving member, an output gear connected to the driven member, another output gear, and planet pinions journalled on a carrier and meshing with the input and output gears; a second planetary gear set including an input gear connected to said another output gear for the first planetary gear set, an output gear, planet pinions journalled on a carrier and meshing with the input and output gears, and a gear connected to the first planetary gear set carrier and engaging the second planetary gear set planet pinions; and control means coacting with the planetary gear sets to impose and maintain a torque load between the driving and driven members.

3. A torque applying device comprising, in combination, driving and driven members; a first planetary gear set including an input gear connected to the driving member, an output gear connected to the driven member, another output gear, and planet pinions journalled on a carrier and meshing with the input and output gears; a second planetary gear set including an input gear connected to said another output gear for the first planetary gear set, an output gear, planet pinions rotatably supported by the first planetary gear and meshing with the input and output gears, and a gear connected to the first planetary gear set carrier and engaging the second planetary gear set planet pinions; and control means coacting with the planetary gear sets to impose and maintain a torque load between the driving and driven members.

4. A torque applying device comprising, in combination, driving and driven members; a first planetary gear set including an input gear connected to the driving member, an output gear connected to the driven member, another output gear, and planet pinions journalled on a carrier and meshing with the input and output gears; a second planetary gear set including an input gear connected to said another output gear for the first planetary gear set, an output gear, planet pinions rotatably supported by the first planetary gear set carrier and meshing with the input and output gears, and a gear connected to the first planetary gear set carrier and engaging the second planetary gear set planet pinions; brake means for holding the second planetary gear set output gear against rotation to impose a torque load between the driving and driven members; and clutch means for maintaining the torque imposed by said brake means.

5. A torque applying device comprising, in combination, driving and driven members; a first planetary gear set including an input gear connected to the driving member, an output gear connected to the driven member, another output gear, and planet pinions journalled on a carrier and meshing with the input and output gears; a second planetary gear set including an input gear connected to said another output gear for the first planetary gear set, an output gear, planet pinions rotatably supported by the first planetary gear set carrier and meshing with the input and output gears, and a gear connected to the first planetary gear set carrier and engaging the second planetary gear set planet pinions; brake means for holding the second planetary gear set output gear against rotation to impose a torque load between the driving and driven members; clutch means for maintaining the torque imposed by said brake means; and indexing means for rotating the planetary gear sets to reposition the driving and driven members so as to permit installation of the torque applying device into a system.

6. A torque applying device comprising, in combination, driving and driven members; a first planetary gear set including an input gear connected to the driving member, an output gear connected to the driven member, another output gear, and planet pinions journalled on a carrier and meshing with the input and output gears; a second planetary gear set including an input gear connected to said another output gear for the first planetary gear set, an output gear, planet pinions journalled on a carrier and meshing with the input and output gears, and a gear connected to the first planetary gear set carrier and engaging the second planetary gear set planet pinions; a third planetary gear set including an input gear connected to the second planetary gear set output gear, a reaction gear, planet pinions meshing with the input and reaction gears and connected with the first planetary gear set; and control means coacting with the third planetary gear set for varying temporarily the drive ratios between the driving and driven members so as to impose a torque load therebetween selectively in forward and reverse directions and thereafter maintain said torque load.

7. A torque applying device comprising, in combination, driving and driven members; a first planetary gear set including an input gear connected to the driving member, an output gear connected to the driven member, another output gear, and planet pinions journalled on a carrier and meshing with the input and output gears; a second planetary gear set including an input gear connected to said another output gear for the first planetary gear set, an output gear, planet pinions journalled on a carrier and meshing with the input and output gears, and a gear connected to the first planetary gear set carrier and engaging the second planetary gear set planet pinions; a third planetary gear set including an input gear connected to the second planetary gear set output gear, a reaction gear, planet pinions meshing with the input and reaction gears and connected with the first planetary gear set; a brake for holding the third planetary gear set reaction gear against rotation to impose a torque load between the driving and driven members.

8. A torque applying device comprising, in combination, driving and driven members; a first planetary gear set including an input gear connected to the driving member, an output gear connected to the driven member, another output gear, and planet pinions journalled on a carrier and meshing with the input and output gears; a second planetary gear set including an input gear connected to said another output gear for the first planetary gear set, an output gear, planet pinions journalled on a carrier and meshing with the input and output gears, and a gear connected to the first planetary gear set carrier and engaging the second planetary gear set planet pinions; a third planetary gear set including an input gear connected to the second planetary gear set output gear, a reaction gear, planet pinions meshing with the input and reaction gears and connected with the first planetary gear set; brake means selectively operable for holding the third planetary gear set reaction gear stationary to impose a torque load between the driving and driven members in one direction and for holding the third planetary gear set input gear stationary to impose a torque load between the driving and driven members in another direction; and clutch means coacting with the third planetary gear set to enforce unitary rotation thereof for maintaining the torque load imposed by the brake means.

9. A torque applying device comprising, in combination, driving and driven members; a first planetary gear set including an input gear connected to the driving member, an output gear connected to the driven member, another output gear, and planet pinions journalled on a carrier and meshing with the input and output gears; a second planetary gear set including an input gear connected to said another output gear for the first planetary gear set, an output gear, planet pinions journalled on a carrier and meshing with the input and output gears, and a gear connected to the first planetary gear set carrier and engaging the second planetary gear set planet pinions; a third planetary gear set including an input gear connected to the second planetary gear set output gear, a reaction gear, planet pinions meshing with the input and reaction gears and connected with the first planetary gear set; brake means selectively operable for holding the third planetary gear set reaction gear stationary to impose a torque load between the driving and driven members in one direction and for holding the third planetary gear set input gear stationary to impose a torque load between the driving and driven members in another direction; clutch means coacting with the third planetary gear set to enforce unitary rotation thereof for maintaining the torque load imposed by the brake means; and indexing means for rotating the planetary gear sets to reposition the driving and driven members so as to permit installation of the torque applying device into a system.

10. A torque applying device comprising, in combination, driving and driven members; a first planetary gear set including an input ring gear connected to the driving member, an output ring gear connected to the driven member, a sun gear, and double planetary pinions mounted on a carrier, one set of said double planetary pinions meshing with the input and output ring gears and the other set meshing with the sun gear; a second planetary gear set including a pair of ring gears, one of said pair of ring gears being connected to the first planetary gear set carrier, and the other of said pair of ring gears being connected to said other set of planetary gears for the first planetary gear set, a sun gear connected to a control shaft, planet pinions meshing with said pair of ring gears and said second planetary gear set sun gear and rotatably supported by the first planetary gear set carrier; a third planetary gear set including a sun gear connected to the control shaft, a reaction ring gear, a planet carrier connected to the first planetary gear set output ring gear, and planet pinions guided by the carrier and meshing with the ring and sun gears; and a brake for holding temporarily said third planetary gear set reaction ring gear stationary to establish a drive ratio between the driving and driven shafts of greater than one for imposing a torque load in a reverse direction between the driving and driven members.

11. A torque applying device comprising, in combination, driving and driven members; a first planetary gear set including an input ring gear connected to the driving member, an output ring gear connected to the driven member, a sun gear and double planet pinions mounted on a carrier, one set of said double planetary pinions meshing with the input and output ring gears and the other set meshing with the sun gear; a second planetary gear set including a pair of ring gears connected to the first planetary gear set carrier, an input ring gear connected to the first planetary gear set sun gear and disposed between said pair of ring gears, a pair of sun gears connected to a control shaft, planet pinions meshing with said pair of ring gears, said second planetary gear set input ring gear and said pair of sun gears and rotatably supported by the first planetary gear set carrier; a third planetary gear set including a sun gear connected to the control shaft, a reaction ring gear, a carrier connected to the first planetary gear set output ring gear, and planet pinions guided by the carrier and meshing with the ring and sun gears; a brake for holding said third planetary gear set sun gear stationary to establish a torque ratio between said first planetary gear set input and output ring gears less than one to impose a torque load in a forward direction between said driving and driven members; and a clutch operable for locking together the sun and ring gears of said third planetary gear set for unitary rotation of the planetary gear sets to maintain the torque load imposed by said brake.

12. A torque applying device comprising, in combination, driving and driven members, a first planetary gear set including an input ring gear connected to the driving member, an output ring gear connected to the driven member, a sun gear, and double planet pinions mounted on a carrier, one set of said double planet pinions meshing with the input and output ring gears and the other set meshing with the sun gear; a second planetary gear set including a pair of ring gears connected to the first planetary gear set carrier, an input ring gear connected to the first planetary gear set sun gear and disposed between said pair of ring gears, a pair of sun gears connected to a control shaft, planet pinions meshing with said pair of ring gears, said second planetary gear set input ring gear and said pair of sun gears and rotatably supported by the first planetary gear set carrier; a third planetary gear set including a sun gear connected to the control shaft, a reaction ring gear, a carrier connected to the first planetary gear set output ring gear, and planet pinions guided by the carrier and rotatably supported by the meshing engagement with the ring and sun gears; a brake for holding said third planetary gear reaction ring gear stationary to establish a torque ratio between said first planetary gear set input and output ring gears greater than one to impose a torque load in a reverse direction between said driving and driven members; a clutch operable for locking together the sun and ring gears of said third planetary gear set for unitary rotation of the planetary gear sets to maintain the torque load imposed by said brakes; and a manually operable device for selectively operating the brake and clutch.

13. A torque applying device comprising, in combination, driving and driven members; a first planetary gear set including an input ring gear connected to the driving member, an output ring gear connected to the driven member; a sun gear and double planet pinions mounted on a carrier, one set of said double planet pinions meshing with the input and output ring gears and the other set meshing with the sun gear; a second planetary gear set including a pair of ring gears connected to the first planetary gear set carrier, an input ring gear connected to the first planetary gear set sun gear and disposed between said pair of ring gears, a pair of sun gears connected to a control shaft, planet pinions meshing with said pair of ring gears, said second planetary gear set input ring gear, and said pair of sun gears, and rotatably supported by the first planetary gear set carrier; a third planetary gear set including a sun gear connected to the control shaft, a reaction ring gear, a planet carrier connected to the first planetary gear set output ring gear, and planet pinions guided by the carrier and rotatably supported by the meshing engagement with the ring and sun gears; brakes selectively operable for holding said third planetary gear set reaction ring gear stationary to establish a torque ratio between said first planetary gear set input and output ring gears greater than one so as to impose a torque load in a reverse direction between said driving and driven members and for holding said third planetary gear set sun gear stationary to establish a torque ratio between said first planetary gear set input and output ring gears less than one so as to impose a torque load in a forward direction between said driving and driven members; a clutch operable for locking together the sun and ring gears of said third planetary gear set for unitary rotation of the planetary gear sets to maintain the torque load imposed by said brakes; a manually operable device for selectively operating the brakes and clutch; and an indexing device for rotating the planetary gear sets to reposition the driving and driven members for installation of the torque applying device into a system.

14. Apparatus of the character described for testing power transmission mechanism comprising, in combination, means for actuating the mechanism including a driving motor and power transmitting connections for simultaneously connecting the driving motor to both the input and output of the mechanism, and a torque applying device interposed in the power connections, the torque applying device comprising driving and driven members; a first planetary gear set including an input gear connected to the driving member, an output gear connected to the driven member, another output gear, and planet pinions journalled on a carrier and meshing with the input and output gears; a second planetary gear set including an input gear connected to said another output gear for the first planetary gear set, an output gear, planet pinions journalled on a carrier and meshing with the input and output gears, and a gear connected to the first planetary gear set carrier and engaging the second planetary gear set planet pinions; and control means coacting with the planetary gear sets to impose and maintain a torque load on the apparatus selectively in forward and reverse directions.

15. Apparatus of the character described for testing power transmission mechanism comprising, in combination, means for actuating the mechanism including a driving motor and power transmitting connections for simultaneously connecting the driving motor to both the input and output of the mechanism, and a torque applying device interposed in the power connections, the torque applying device comprising driving and driven members; a first planetary gear set including an input gear connected to the driving member, an output gear connected to the driven member, another output gear, and planet pinions journalled on a carrier and meshing with the input and output gears; a second planetary gear set including an input gear connected to said another output gear for the first planetary gear set, an output gear, planet pinions journalled on a carrier and meshing with the input and output gears, and a gear connected to the first planetary gear set carrier and engaging the second planetary gear set planet pinions; a third planetary gear set including an input gear connected to the secondary planetary gear set output gear, a reaction gear, planet pinions meshing with the input and reaction gears and connected with the first planetary gear set; and control means coacting with the third planetary gear set for varying temporarily the drive ratios between the driving and driven members so as to impose a torque load therebetween selectively in forward and reverse directions and thereafter maintain said torque load.

16. Apparatus of the character described for testing power transmission mechanism comprising, in combination, means for actuating the mechanism including a driving motor and power transmitting connections for simultaneously connecting the driving motor to both the input and output of the mechanism, and a torque applying device interposed in the power connections, the torque applying device comprising driving and driven members; a first planetary gear set including an input ring gear connected to the driving member, an output ring gear connected to the driven member, a sun gear and double planet pinions mounted on a carrier, one set of said double planet pinions meshing with the input and output ring gears and the other set meshing with the sun gear; a second planetary gear set including a pair of ring gears connected to the first planetary gear set carrier, an input ring gear connected to the first planetary gear set sun gear and disposed between said pair of ring gears, a pair of sun gears connected to a control shaft, planet pinions meshing with said pair of ring gears, said second planetary gear set ring gear, and said pair of sun gears and rotatably supported by the first planetary gear set carrier; a third planetary gear set including a sun gear connected to the control shaft, a reaction ring gear, a planet carrier connected to the first planetary gear set output ring gear, and planet pinions guided by the carrier and rotatably supported by the meshing engagement with the ring and sun gears; and brakes selectively operable for holding temporarily said third planetary gear set reaction ring gear stationary to establish a torque ratio between said first planetary gear set input and output ring gears greater than one to impose a torque load in a reverse direction between said driving and driven members and for holding temporarily said third planetary gear set sun gear stationary to establish a torque ratio between said first planetary gear set input and output ring gears less than one to impose a torque load in a forward direction between said driving and driven members; a clutch operable for locking together the sun and ring gears of said third planetary gear set for unitary rotation of the planetary gear sets to maintain the torque load imposed by said brake; and a manually operable device for selectively operating the brakes and clutch.

17. Apparatus of the character described for testing power transmission mechanism comprising, in combination, input and output shafts for the mechanism, a line shaft, two sets of oppositely disposed transfer gearing, one set being disposed between the line shaft and the mechanism input shaft and the other set between the line shaft and the mechanism output shaft, each set of transfer gearing providing a speed ratio therethrough that will maintain the selected speed ratio through the mechanism, a torque applying device including driving and driven members interconnected with one of said sets of gearing and one of said shafts, a first planetary gear set including an input gear connected to the driving member, an output gear connected to the driven member, another output gear, and planet pinions journalled on a carrier and meshing with the input and output gears; a second planetary gear set including an input gear connected to said another output gear for the first planetary gear set, an output gear, planet pinions journalled on a carrier and meshing with the input and output gears, and a gear connected to the first planetary gear set carrier and engaging the second planetary gear set planet pinions; and control means coacting with the planetary gear sets to impose and maintain a torque load between the driving and driven members, and a driving motor for rotating the apparatus and the mechanism while subjected to the torque load.

18. Apparatus of the character described for testing power transmission mechanism comprising, in combination, input and output shafts for the mechanism, a line shaft, two sets of oppositely disposed transfer gearing, one set being disposed between the line shaft and the mechanism input shaft and the other set between the line shaft and the mechanism output shaft, each set of transfer gearing providing a speed ratio therethrough that will maintain the selected speed ratio through the mechanism, a torque applying device including driving and driven members interconnected with one of said sets of gearing and one of said shafts, a first planetary gear set including an input ring gear connected to the driving member, an output ring gear connected to the driven member, a sun gear and double planet pinions mounted on a carrier, one set of said double planetary pinions meshing with the input and output ring gears and the other set meshing with the sun gear; a second planetary gear set including a pair of ring gears connected to the first planetary gear set carrier, an input ring gear connected to the first planetary gear set sun gear and disposed between said pair of ring gears, a pair of sun gears connected to a control shaft, planet pinions meshing with said pair of ring gears, said second planetary gear set input ring gear, and said pair of sun gears and rotatably supported by the first planetary gear set carrier; a third planetary gear set including a sun gear connected to the control shaft, a reaction ring gear, a planet carrier connected to the first planetary gear set output ring gear, and planet pinions guided by the carrier and rotatably supported by the meshing engagement with the ring and sun gears; brakes selectively operable for holding said third planetary gear set reaction ring gear stationary to establish a torque ratio between said first planetary gear set input and output ring gears greater than one to impose a torque load in a reverse direction between said driving and driven members and for holding said third planetary gear set sun gear stationary to establish a torque ratio between said input and output ring gears less than one to impose a torque load in a forward direction between said driving and driven members; a clutch operable for locking together the sun and ring gears of said third planetary gear set for unitary rotation of the planetary gear sets to maintain the torque load imposed by said brakes; a manually operable device for selectively operating the brakes and clutch, and a driving motor for rotating the apparatus and the mechanism while subjected to the torque load.

19. A torque applying device comprising, in combination, input and output members, planetary gearing drive connecting the input and output members, the planetary gearing including a forward torque applying element and a reverse torque applying element, and brake means selectively operable to resist rotation of the forward and the reverse torque applying elements so as to vary the drive ratio between the input and output members and thereby impose a torque load between the input and output members respectively in the forward and reverse directions.

20. A torque applying device comprising, in combination, input and output members, planetary gearing drive connecting the input and output members, the planetary gearing including a forward torque applying element and a reverse torque applying element, brake means selectively operable to resist rotation of the forward and the reverse torque applying elements so as to vary the drive ratio between the input and output members and thereby impose a torque load between the input and output members respectively in the forward and the reverse directions, and indexing means including a drive connection extending through the gearing for revolvably repositioning the input and output members by the gearing so as to facilitate the installation of the torque applying device into a system.

21. A torque applying device comprising, in combination, input and output members, planetary gearing drive connecting the input and output members, the planetary gearing including a forward torque applying element and a reverse torque applying element, brake means selectively operable to resist rotation of the forward and the reverse torque applying elements so as to vary the drive ratio between the input and output members and thereby impose a torque load between the input and output members respectively in the forward and the reverse directions, and clutch means locking up the gearing so as to prevent relative movement between the input and output members and thereby maintain the imposed torque load.

22. A torque applying device comprising, in combination, input and output members, a plurality of planetary gear sets drive connecting the input and output members, the planetary gear sets including a torque direction control gear set having both a forward torque applying element and a reverse torque applying element, and brake means selectively operable to resist rotation of the forward and the reverse torque applying elements so as to vary the drive ratio between the input and output members and thereby impose a torque load between the input and output members respectively in the forward and the reverse directions.

23. A torque applying device comprising, in combination, input and output members, a plurality of planetary gear sets drive connecting the input and output members, the planetary gear sets including a torque direction control gear set having both a forward torque applying element and a reverse torque applying element, brake means selectively operable to resist rotation of the forward and the reverse torque applying elements so as to vary the drive ratio between the input and output members and thereby impose a torque load between the input and output members respectively in the forward and the reverse directions, and clutch means locking up one of the gear sets so as to prevent relative movement between the input and output members and thereby maintain the torque load imposed by the brake means.

24. A torque applying device comprising, in combination, input and output members; a plurality of interconnected planetary gear sets drive connecting the input and output members and so arranged as to vary the drive ratio therebetween; the planetary gear sets including a plurality of torque applying elements; and brake means selectively operable to resist the rotation of each of the torque applying elements and thereby cause the drive ratio between the input and output members to be varied so that when resisting rotation of one of the torque applying elements a torque load is imposed between the input and output members in a forward direction and when resisting rotation of another of the torque applying elements a torque load is imposed between the input and output members in a reverse direction.

25. A torque applying device comprising, in combination, input and output members; a plurality of interconnected planetary gear sets drive connecting the input and output members and so arranged as to vary the drive ratio therebetween; the planetary gear sets including a plurality of torque applying elements; brake means selectively operable to resist the rotation of the torque applying elements and thereby cause the drive ratio between the input and output members to be varied so that when resisting rotation of one of the torque applying elements a torque load is imposed between the input and output members in a forward direction and when resisting rotation of another of the torque applying elements a torque load is imposed between the input and output members in a reverse direction; and clutch means locking up the planetary gear sets so as to prevent relative rotation between the input and output members and thereby maintain the torque loads imposed by the brake means.

26. Apparatus of the character described for testing power transmission mechanism comprising, in combination, means actuating the mechanism including a driving motor and power transmitting connections for simultaneously connecting the driving motor to both the input and output of the mechanism; and a torque applying device interposed in the power transmitting connections; the torque applying device including driving and driven members, planetary gearing drive connecting the driving and driven members, the planetary gearing including a forward torque applying element and a reverse torque applying element, and brake means selectively operable to resist rotation of the forward and the reverse torque applying element so as to vary the drive ratio between the driving and driven members and thereby impose a torque load between the driving and driven members respectively in the forward and the reverse directions.

27. Apparatus of the character described for testing power transmission mechanism comprising, in combination, means actuating the mechanism including a driving motor and power transmitting connections for simultaneously connecting the driving motor to both the input and output of the mechanism; and a torque applying device interposed in the power transmitting connections; the torque applying device including driving and driven members, planetary gearing drive connecting the driving and driven members, the planetary gearing including a forward torque applying element and a reverse torque applying element, brake means selectively operable to resist rotation of the forward and the reverse torque applying element so as to vary the drive ratio between the driving and driven members and thereby impose a torque load between the driving and driven members respectively in the forward and reverse directions, and clutch means locking up the gearing so as to prevent relative rotation between the driving and driven members and thereby maintain the torque loads imposed by the brake means.

28. Apparatus of the character described for testing power transmission mechanism comprising, in combination, means for actuating the mechanism including a driving motor and power transmitting connections for simultaneously connecting the driving motor to both the input and the output of the mechanism; and a torque applying device interposed in the power transmitting connections; the torque applying device including input and output members, a plurality of planetary gear sets drive connecting the input and output members, the planetary gear sets including a torque direction control gear set having both a forward torque applying element and a reverse torque applying element, and brake means selectively operable to resist rotation of the forward and the reverse torque applying elements so as to vary the drive ratio between the input and output members and thereby impose a torque load between the input and the output members respectively in the forward and the reverse directions.

29. Apparatus of the character described for testing power transmission mechanism comprising, in combination, means actuating the mechanism including a driving motor and power transmitting connections for simultaneously connecting the driving motor to both the input and output of the mechanism; and a torque applying device interposed in the power transmitting connections; the torque applying device including input and output members, a plurality of interconnected planetary gear sets drive connecting the input and output members and so arranged as to vary the drive ratio therebetween, the planetary gear sets including a plurality of torque applying elements, brake means selectively operable to resist rotation of the torque applying elements and thereby cause the drive ratio between the input and output members to be varied so that when resisting rotation of one of the torque applying elements a torque load is imposed between the input and output members in a forward direction and when resisting rotation of another of the torque applying elements a torque is imposed between the input and output members in a reverse direction, and clutch means releasably locking up the planetary gear sets so as to prevent relative rotation between the input and output members thereby maintaining the torque loads imposed by the brake means.

30. Apparatus of the character described for testing power transmission mechanism comprising, in combination, input and output shafts for the mechanism; a line shaft; two sets of oppositely disposed transfer gearing; one set being disposed between the line shaft and the mechanism input shaft and the other set between the line shaft and the mechanism output shaft; each set of transfer gearing providing a speed ratio therethrough that will maintain the selected speed ratio through the mechanism; a torque applying device including driving and driven members interconnected with one of said sets of gearing and one of said shafts, a plurality of interconnected planetary gear sets drive connecting the driving and driven members and so arranged as to vary the drive ratio therebetween, the planetary gear sets including a plurality of torque applying elements, brake means selectively operable to resist rotation of the torque applying elements and thereby cause the drive ratio between the driving and driven members to be varied so that when resisting rotation of one of the torque applying elements a torque load is imposed between the driving and driven members in a forward rotation and when resisting rotation of another of the torque applying elements a torque load is imposed between the driving and driven members in a reverse direction; and a driving motor for rotating the apparatus and the mechanism while subjected to the torque load.

31. Apparatus of the character described for testing power transmission mechanism comprising, in combination, input and output shafts for the mechanism; a line shaft; two sets of oppositely disposed transfer gearing; one set being disposed between the line shaft and the mechanism input shaft and the other set between the line shaft and the mechanism output shaft; each set of transfer gearing providing a speed ratio therethrough that will maintain the selected speed ratio through the mechanism; a torque applying device including driving and driven members interconnected with one of said sets of gearing and one of said shafts, a plurality of planetary gear sets drive connecting the driving and driven members, the planetary gear sets including a torque direction control gear set having both a forward torque applying element and a reverse torque applying element, brake means selectively operable to resist rotation of the forward or the reverse torque applying elements so as to vary the drive ratio between the driving and driven members and thereby impose a torque load between the driving and driven members respectively in the forward or reverse directions, and means clutching the planetary gearing so as to lock up the planetary gear sets and prevent relative rotation between the driving and driven members thereby maintaining the torque loads imposed by the brake means; and a driving motor for rotating the apparatus and the mechanism while subjected to the torque load.

References Cited in the file of this patent
UNITED STATES PATENTS

| | | |
|---|---|---|
| 2,371,607 | Collins | Mar. 20, 1945 |
| 2,516,748 | Boice | July 25, 1950 |